US012396549B2

(12) United States Patent
Wright

(10) Patent No.: US 12,396,549 B2
(45) Date of Patent: Aug. 26, 2025

(54) PORTABLE LIQUID COVER SYSTEM

(71) Applicant: Mark Edwin Wright, Conesville, OH (US)

(72) Inventor: Mark Edwin Wright, Conesville, OH (US)

( * ) Notice: Subject to any disclaimer, the term of this patent is extended or adjusted under 35 U.S.C. 154(b) by 0 days.

(21) Appl. No.: 18/299,826

(22) Filed: Apr. 13, 2023

(65) Prior Publication Data

US 2024/0341462 A1 Oct. 17, 2024

(51) Int. Cl.
*A46B 11/06* (2006.01)
*A46B 15/00* (2006.01)
*B05C 17/03* (2006.01)

(52) U.S. Cl.
CPC ........ *A46B 11/063* (2013.01); *A46B 15/0095* (2013.01); *B05C 17/0333* (2013.01); *A46B 11/06* (2013.01); *A46B 2200/202* (2013.01)

(58) Field of Classification Search
CPC .............. A46B 11/063; A46B 15/0095; A46B 2200/202; A46B 11/06; A46B 11/00; A46B 11/0072; A46B 2200/20; B05C 17/0333; B05C 17/02; B05C 17/03; B05C 17/0357
USPC ... 401/152, 156, 157, 289, 188 R, 270, 286, 401/287
See application file for complete search history.

(56) References Cited

U.S. PATENT DOCUMENTS 3,184,113 A * 5/1965 Curtis ..................... B05B 9/047 239/323
3,332,102 A * 7/1967 Brinker ................ A46B 11/063 401/289
3,371,980 A * 3/1968 Stefely ................. A46B 11/063 401/289
3,640,630 A * 2/1972 Walker ................ B05C 17/0316 401/23
4,431,326 A * 2/1984 Braithwaite ............. B44D 3/00 401/187
2004/0240929 A1* 12/2004 Watson .............. A46B 11/0013 401/282
2006/0120794 A1* 6/2006 Scott ..................... B05C 17/002 401/188 R
2007/0280776 A1* 12/2007 Castellana ........... A46B 11/063 401/289
2016/0249734 A1* 9/2016 Roman .................. A46B 11/06 401/188 R

* cited by examiner

*Primary Examiner* — David J Walczak
(74) *Attorney, Agent, or Firm* — Steven A. Hill

(57) ABSTRACT

A liquid cover system comprising a vessel, a brush, and a hose, which efficiently applies liquid cover to a surface. The system includes an upper chamber and a lower chamber separated by a flexible diaphragm, which are pressurized by a handle connected to a pump body to force liquid cover through an outlet and the hose to the brush. The brush includes a pliable tube held at a slight angle towards one edge of bristles, to efficiently apply liquid cover to trailing edge bristles. The brush is secured to a handle, which includes a lever for controlling paint flow and a threaded outlet, and a sliding dovetail connection provided by a top joint and a bottom joint.

2 Claims, 5 Drawing Sheets

PORTABLE LIQUID COVER SYSTEM

BACKGROUND OF THE INVENTION

The present disclosure relates to a novel device for applying paint or other liquid covering material onto a surface via a brush.

SUMMARY OF THE INVENTION

Broadly, the invention is a portable liquid cover system, such as for painting, providing mobility and safety to the person using it. The invention can be used to apply a variety of liquid cover materials to surfaces, such as varnish or stain for finishing wood, ink for large scaled calligraphy or drawing such as artwork for murals, or adhesives. It can also be used in various industrial applications, such as coating metals or plastics with lubricants or other liquids.

The invention includes a hand air pump screwed into the top portion of a vessel. The top part is cinched with the lower paint chamber, which has a rubber bladder to keep the air and paint separated. Pumping the air pump pressurizes the rubber bladder, forcing the paint in the lower paint chamber through a tube at the bottom of the chamber to the hand valve.

The hand valve has a machined and a molded end that can accommodate paintbrushes of different sizes by sliding them together. Once attached, a screw or washer secures the brush in place. When the hand valve lever is depressed, it regulates the amount of paint flowing to the bristles through a pliable, flexible tube, which moves with the brush in any direction. This pliable tube can be made at different lengths along the brush bristles to cater to various applications, be it painting walls or ceilings. The vessel, along with the hose and paintbrush, can be carried in a backpack. The backpack features a zipper area or slot to accommodate the hose connection. A magnet or spring-loaded clip across a front panel of the backpack, in the chest area, secures the paintbrush in an upright position to prevent dripping. This provides significant safety for the person using this, allowing the user to have both hands free to move about and climb a ladder safely.

The materials used to make this invention include plastic vessel, rubber air pump, plastic hand valve, machined aluminum for sliding together to change the brush, steel tubing, wooden paintbrush, rubber balloon, and screws.

DETAILED DESCRIPTION OF THE INVENTION

In the following detailed description, reference is made to the accompanying drawings, which form a part hereof, and in which are shown various specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the present disclosure. The following detailed description, therefore, is not to be taken in a limiting sense. The scope of the present disclosure is defined only by the appended claims, along with the full scope of equivalents to which such claims are entitled.

The following reference numbers are used in the figures and accompanying descriptions:

The following reference numbers are used in the figures and accompanying descriptions:

| No. | Name |
|---|---|
| 100 | liquid cover system |
| 102 | brush |
| 104 | hose |
| 106 | vessel |
| 108A | pump handle |
| 108B | pump body |
| 110 | top chamber |
| 112 | bottom chamber |
| 114 | latch |
| 114A | top latch |
| 114B | bottom latch |
| 116 | outlet |
| 118 | connector |
| 120 | diaphragm |
| 122 | liquid cover |
| 200 | brush handle |
| 202 | lever |
| 203 | outlet |
| 204 | top joint |
| 204A | input hole |
| 204B | groove |
| 206 | screw |
| 208A | set screw |
| 208B | washer |
| 210 | bottom joint |
| 210A | tongue |
| 212 | rigid tube |
| 214 | pliable tube |
| 216 | binder |
| 218 | bristles |
| 220 | "O" ring |
| 302 | person |
| 304 | backpack |
| 306 | front panel |
| 308 | back compartment |

BRIEF DESCRIPTION OF DRAWINGS

For a fuller understanding of the nature and advantages of the present invention, reference should be had to the following detailed description taken in connection with the accompanying drawings, in which.

The figures here represent one embodiment of the invention.

DETAILED DESCRIPTION OF THE DRAWINGS

In the following detailed description, reference is made to the accompanying drawings, which form a part hereof, and in which are shown various specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the present disclosure. The following detailed description, therefore, is not to be taken in a limiting sense. The scope of the present disclosure is defined only by the appended claims, along with the full scope of equivalents to which such claims are entitled.

Figure 1:
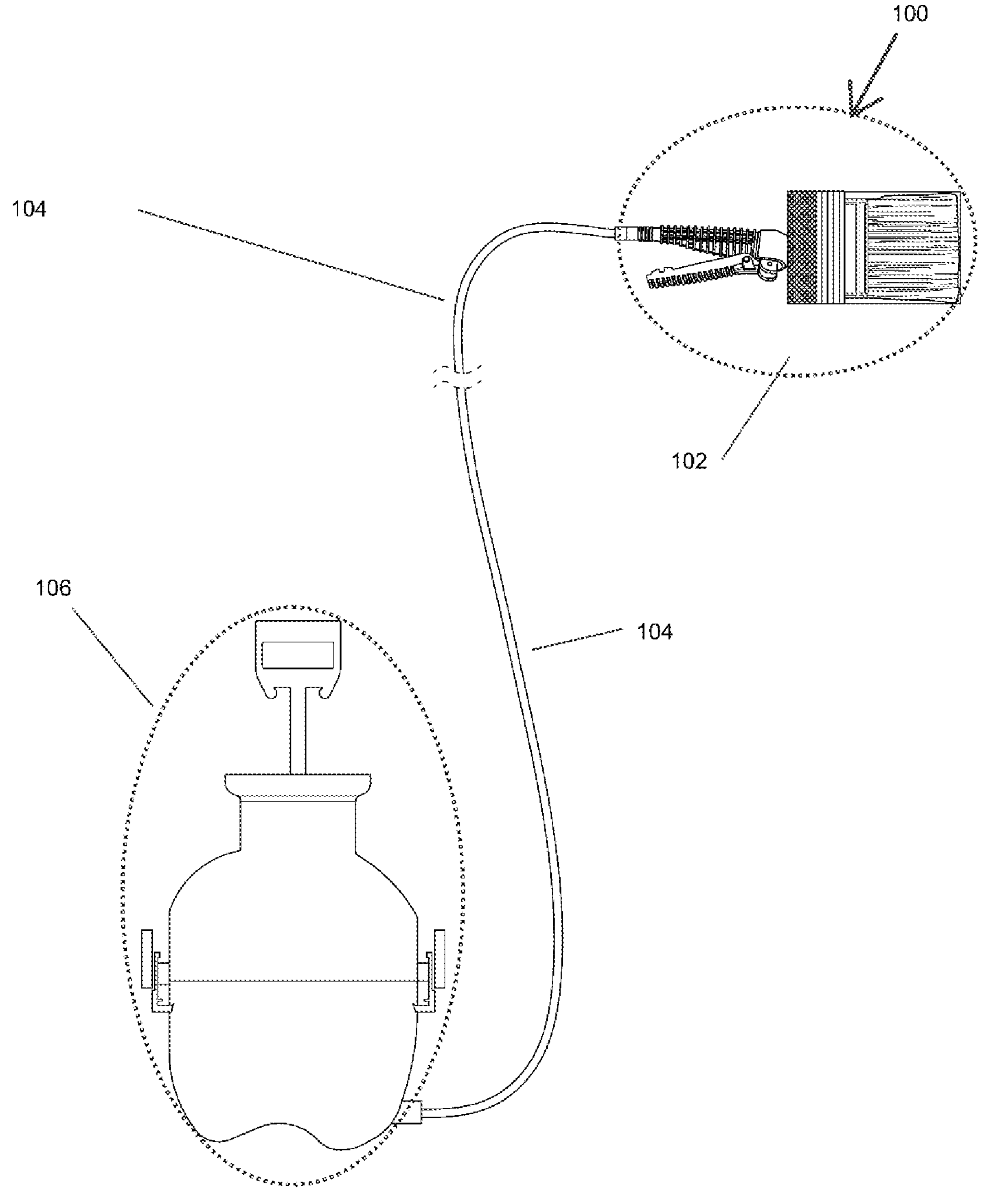
FIG. 1 is a view of the completed liquid cover system, comprising a vessel, hose, and brush.

FIG. 1 shows a liquid cover system 100 as assembled, including a vessel 106, a brush 102, and a hose 104 connected to the vessel 100.

Figure 2A:
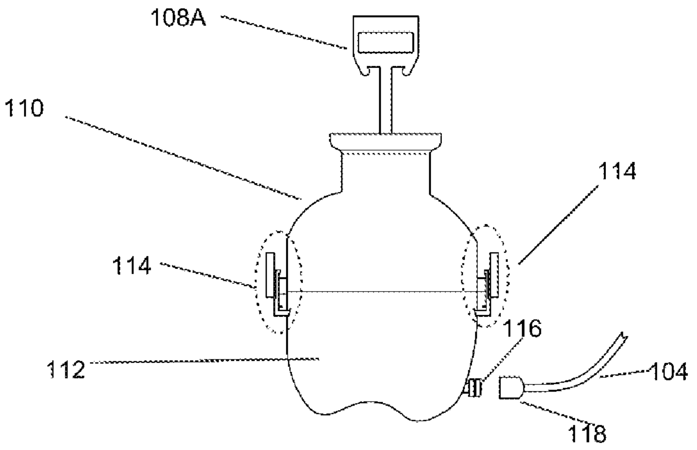
FIG. 2A shows various important components of the assembled vessel.

FIG. 2A identifies key parts of the liquid cover system, including vessel 106 having an upper chamber 110, lower chamber 112, latches 114 that hold the upper 110 and lower 112 chambers together, outlet 116, hose 104 delivering liquid cover to the brush, and connector 118. Pump handle 108A is used in conjunction with pump body 108B (discussed below) to create air pressure in the upper chamber. The shape of pump handle 108A and its attachment to pump body 108B show that the pump handle 108A is arm operated, by person 302 (discussed below with respect to FIG. 5A), as would any pump with a handle similar to pump handle 108A.

Figure 2B:
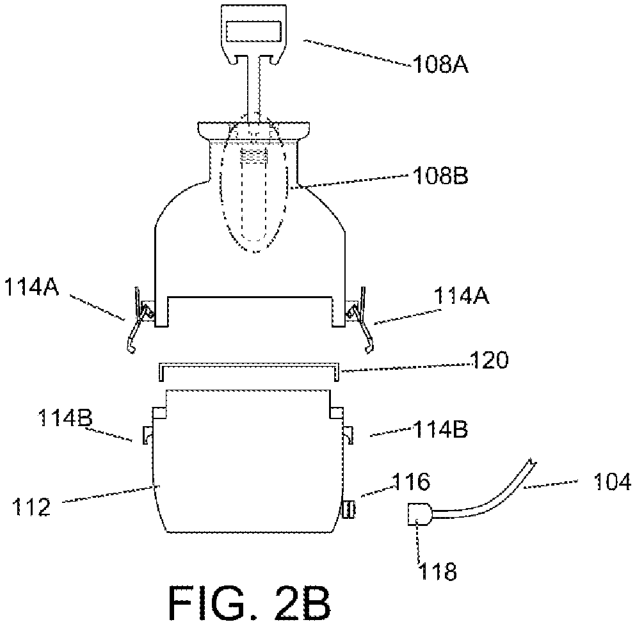
FIG. 2B is an exploded view, principally showing chambers and a diaphragm between them.

FIG. 2B is an exploded view. Diaphragm 120 is deployed between upper chamber 110 and lower chamber 112, to separate liquid cover in the lower chamber from air in the upper chamber in an air-tight manner. The pump handle 108A is pumped to cause pump body 108B to create air pressure in the upper chamber 110. The diaphragm 120 is flexible so that air pressure applied to the upper chamber applies corresponding pressure, without leakage, in the lower chamber to force liquid cover through outlet 116 and through the hose 104, via secure connection provided by connector 118 attached to outlet 116. Furthermore, the diaphragm 120 may be disposable so as not need to be cleaned, or of a more permanent design which would requiring cleaning.

Figure 2C:
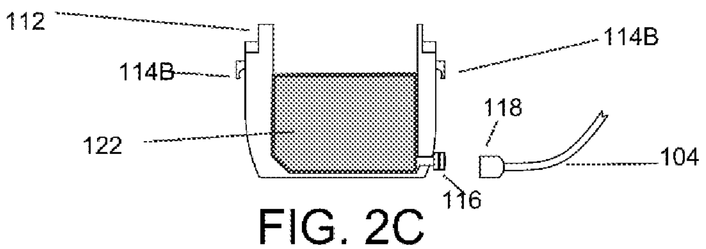
FIG. 2C is an interior view of the bottom chamber.

FIG. 2C is an interior view of the bottom chamber, principally showing liquid cover 122.

Figure 3A:
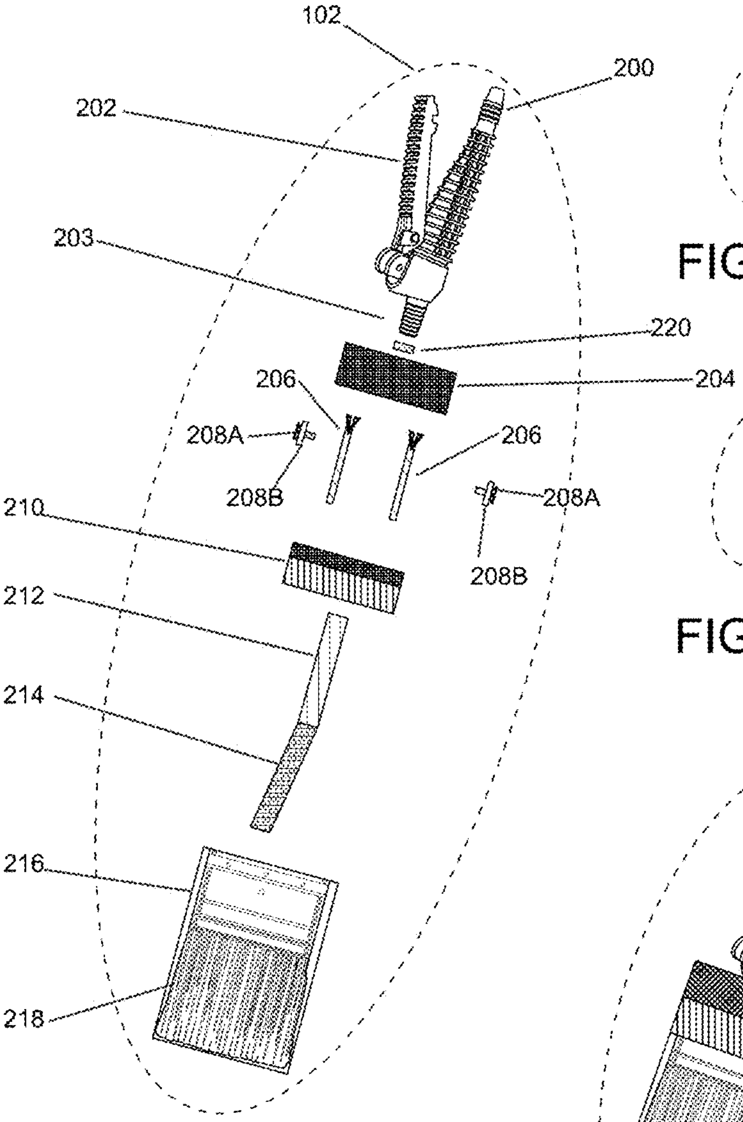
FIG. 3A is an exploded view of the brush.

FIG. 3A is an exploded view of brush 102. Brush handle 200 includes a lever 202 to control paint flow, and a threaded outlet 203. Brush handle 200 is screwed into top joint 204 and hole input 204A, with O ring 220 between them. Rigid tube 212 and pliable tube 214 connected to it are inserted into bottom joint 210. Then the combination of bottom joint 210, rigid tube 212, and pliable tube 214 are inserted brush binder 216 and secured by screws 206, so that rigid tube 212 remains straight along the brush axis while pliable tube 214 departs from the rigid tube at an angle toward a leading edge of the bristles 218, the outlet of the pliable tube being positioned closer to said leading edge than to an opposite edge of the bristles. This configuration delivers liquid cover 122 to the leading edge, allowing trailing bristles to spread the coating evenly.

Figure 3B:
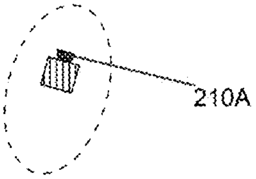
FIGS. 3B and 3C are side views, respectively, bottom joint and top joint.
Figure 3C:
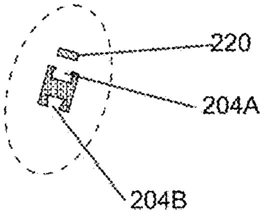

Refer now to FIGS. 3B and 3C for side views, respectively, of bottom joint 210 and top joint 204, showing the sliding dovetail attribute with groove 204B in top joint 204 and tongue 210A in bottom joint 210. Top joint 204 and bottom joint 210 are slid into place and alignment, each with holes reaching through to deliver liquid cover 122 through brush handle 200 and eventually through pliable tube 214 and into bristles 218. This connection between top joint 204 and bottom joint 210 is secured by a pair of set screws 208A and washers 208B.

Figure 3D:
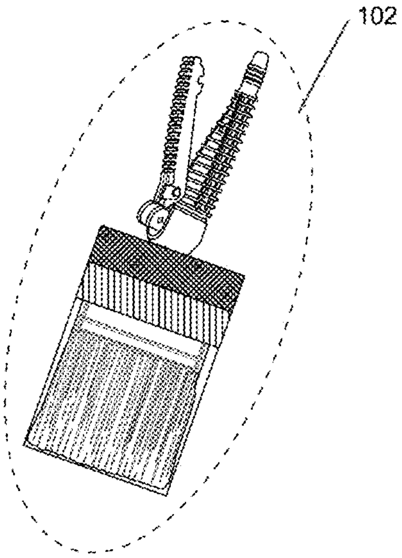
FIG. 3D shows the assemble brush.

FIG. 3D shows the final, assembled brush 102.

Figure 4:
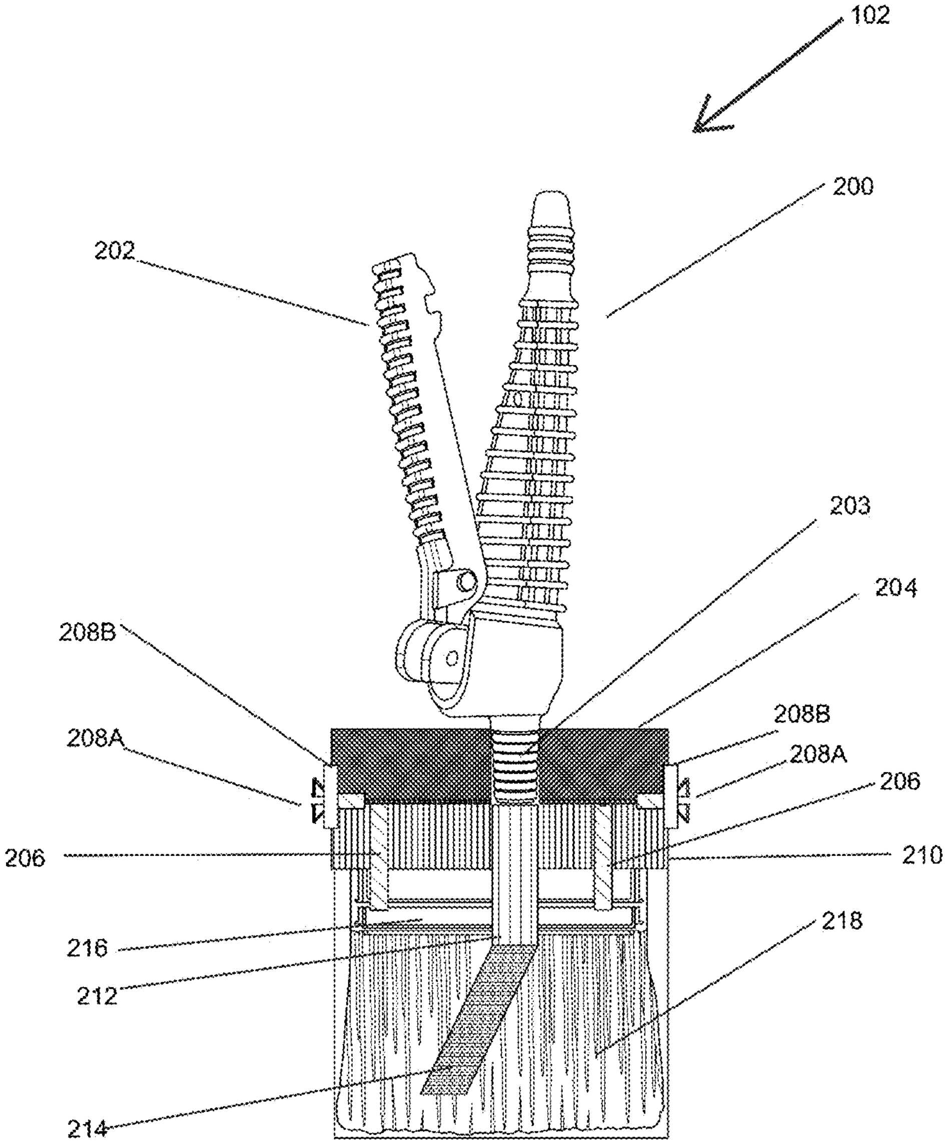
FIG. 4 is a cut away view of the assembled brush.

For clarification, FIG. 4 is a cut away view of assembled brush 102, further showing placement and connection of the various components.

Figure 5A:
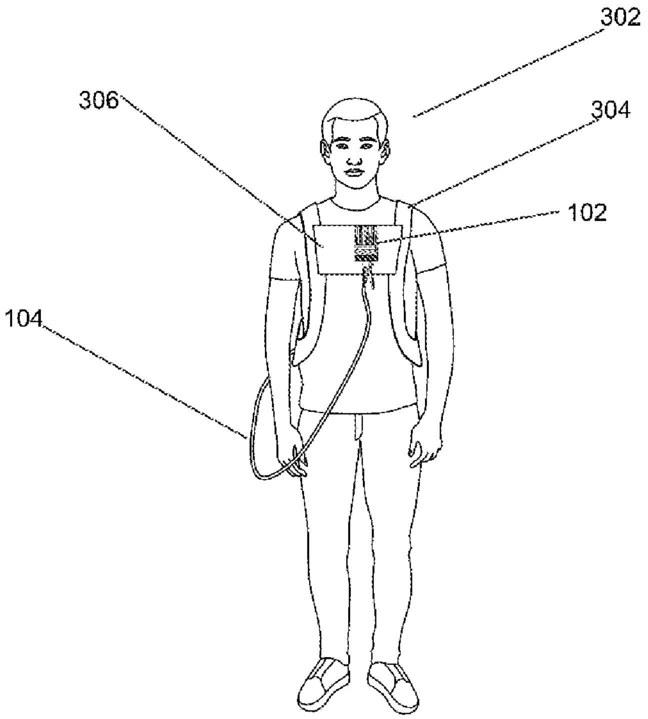
FIGS. 5A and 5B show a person using the liquid cover system with a backpack.
Figure 5B:
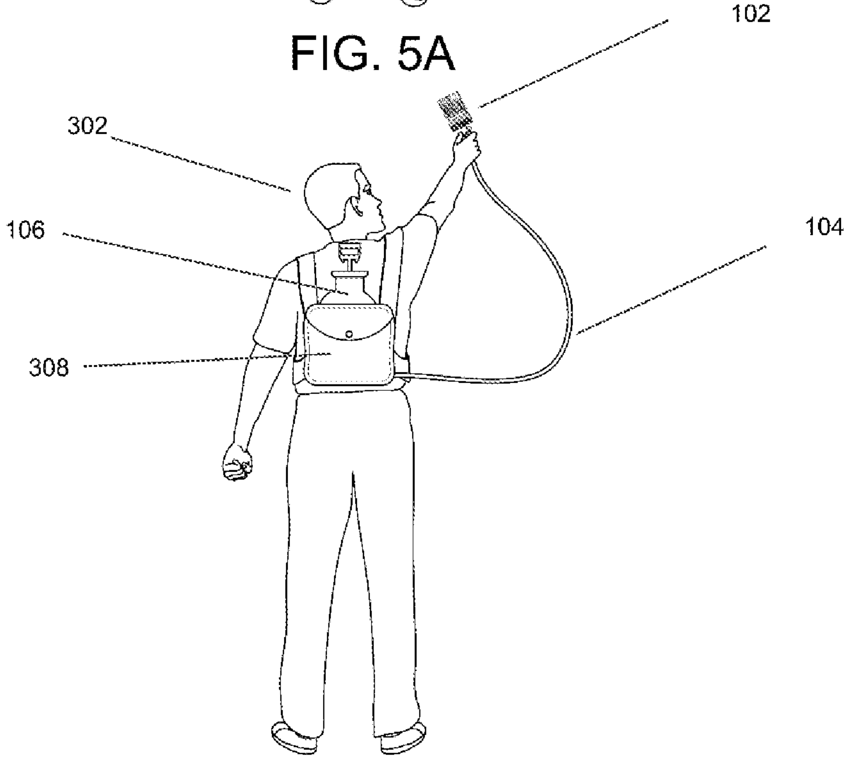

FIGS. 5A and 5B introduce a person 302 wearing a backpack 304. The backpack 304 includes front panel 306 and back compartment 308. Back compartment 308 is designed to hold vessel 106, and to allow hose 104 to be connected to outlet 116. Front panel is provided with some means, such as a clip or magnet, to hold brush 102 while not being actively used to apply liquid cover 122 to a surface.

In addition to the advantages of this invention listed above, several ergonomic and efficiency advantages and benefits accrue in a liquid cover system 100 that does not require a person 302 to bend over to get paint on a brush 102. These include reduced strain on the back. By providing an alternative method for getting paint onto the brush 102, the person 302 can maintain a more neutral and comfortable position, reducing the risk of back pain and injury associated with prolonged bending.

Another benefit is improved posture. With very limited bending over, a person 302 can maintain a more upright and neutral posture, which can reduce stress on the back and other parts of the body. By keeping the body in a more ergonomic position, the person 302 can help prevent issues such as muscle tension, discomfort, and fatigue.

Yet another benefit is increased efficiency. By limiting the need to bend over, a person 302 can work more efficiently and with less fatigue. This can help reduce the risk of mistakes, risk and danger of spillage, and increase productivity.

Still further, another benefit is better access. The liquid cover system 100 keeps the paint or other liquid cover 122 readily available to apply to a surface, and at reduced risk of spillage. Person 302 can more easily access the liquid cover 122 without having to reach, stretch, or strain. This also reduces the risk of spillage. All of this can help to reduce the risk of slips, trips, and falls, as well as improve overall safety in the workspace.

Although the invention has been described with reference to various embodiments, those skilled in the art will understand that various changes may be made and equivalents may be substituted for elements thereof without departing from the scope and essence of the disclosure. In addition, many modifications may be made to adapt a particular situation or material in accordance with the teachings of the disclosure without departing from the essential scope thereof. Therefore, it is intended that the disclosure not be limited to the particular embodiments disclosed, but that the disclosure will include all embodiments falling within the scope of the appended claims. Also, any and all citations referred to herein are expressly incorporated herein by reference.

I claim:

1. A system for applying liquid cover to a surface, comprising a vessel (106) having an upper chamber (110) and a lower chamber (112) separated by a flexible diaphragm (120), wherein said flexible diaphragm (120) is disposable, latches (114) holding the upper chamber (110) and lower chamber (112) together, an outlet (116) for liquid cover (122), a hose (104) connected to the outlet (116), a brush (102) adapted to receive liquid cover (122) from the hose (104) via a pliable tube (214), the brush (102) further having bristles (218), the brush (102) further having a brush handle (200) and a lever (202), wherein the lever (202) is manually operable, a pump handle (108A) wherein the pump handle (108A) is connected to a pump body (108B), further wherein the upper chamber (110) is pressurized by operation of the pump handle (108A) and the pump body (108B), wherein the pump handle (108*a*) is arranged to receive an applied force, which causes pressure in the upper chamber (110) to apply corresponding pressure to the lower chamber (112) to force the liquid cover (122) through the outlet (116) and hose (104) to the brush (102).

2. The system of claim 1, wherein the brush (102) further comprises a rigid tube (212) attached to the pliable tube (214), the rigid tube extending along a longitudinal axis of the brush handle and the pliable tube extending from the rigid tube at an angle toward one edge of the bristles (218) such that an outlet end of the pliable tube is nearer to said edge than to an opposite edge of the bristles, thereby delivering liquid cover (122) to that edge for efficient spreading by trailing bristles.

* * * * *